June 28, 1966     R. L. HURTLE     3,258,562
ELECTRIC CIRCUIT PROTECTIVE DEVICE WITH ENERGY DIVERTING MEANS
Original Filed April 16, 1962     2 Sheets-Sheet 1
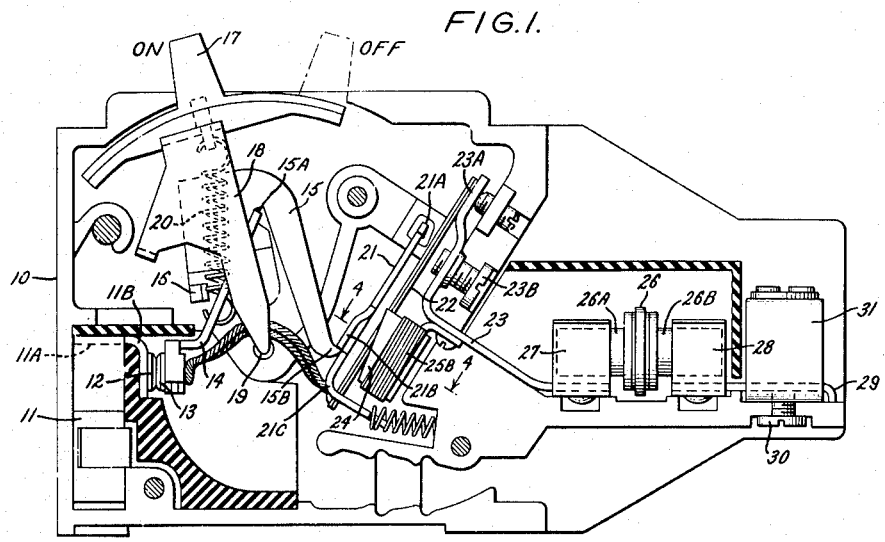
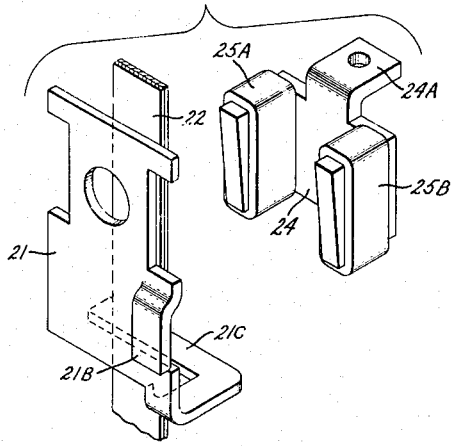
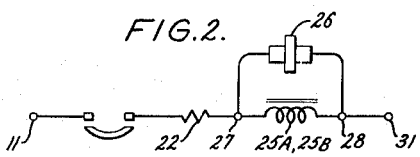
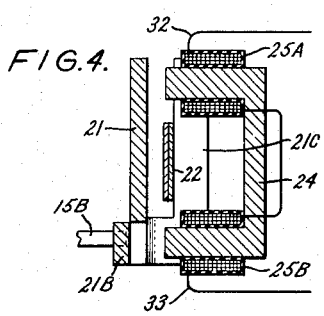
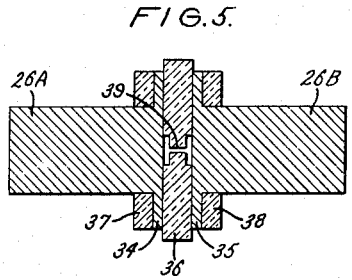
INVENTOR:
RALPH L. HURTLE,
BY *Robert T. Casey*
ATTORNEY.

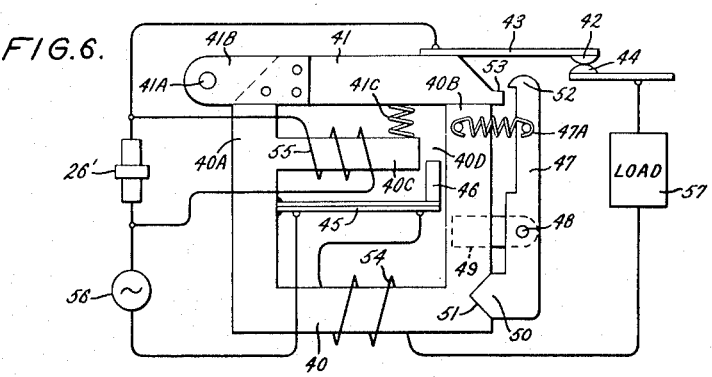
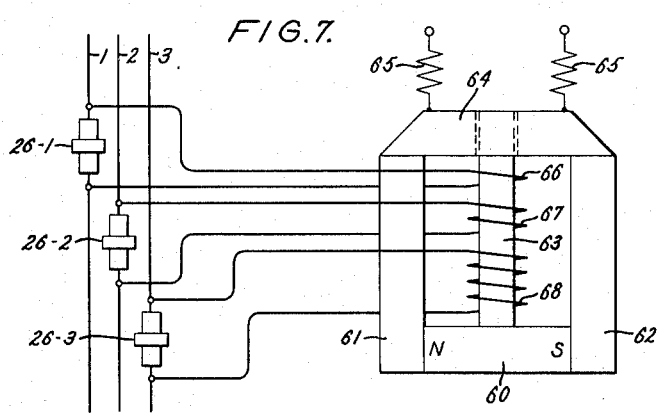
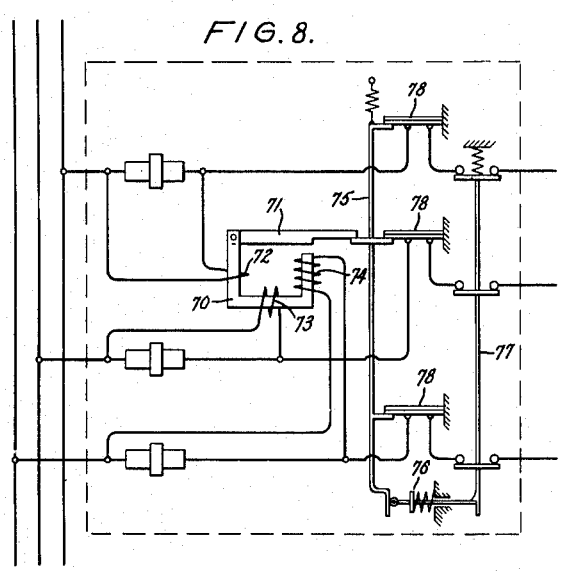
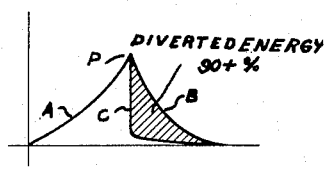
INVENTOR:
RALPH L. HURTLE,
BY Robert P. Casey
ATTORNEY.

United States Patent Office 3,258,562
Patented June 28, 1966

3,258,562
ELECTRIC CIRCUIT PROTECTIVE DEVICE WITH ENERGY DIVERTING MEANS
Ralph L. Hurtle, West Hartford, Conn., assignor to General Electric Company, a corporation of New York
Original application Apr. 16, 1962, Ser. No. 187,793. Divided and this application Oct. 21, 1965, Ser. No. 499,465
10 Claims. (Cl. 200—88)

This application is a division of application Serial No. 187,793, filed April 16, 1962, and assigned to the same assignee as the present invention.

The present invention relates to electric circuit protective devices, and particularly to circuit protective devices of the type incorporating separable contacts, and manual and automatic means for opening said contacts, combined with current limiting means for limiting the values of potentially high short circuit currents through the device.

In accordance with prior art, protective devices including circuit breakers combined with current limiting means have ordinarily comprised circuit breakers combined with current-limiting fuses, and means for ensuring opening of the circuit breaker upon blowing of such fuses.

Such combinations suffer from the obvious disadvantage that it is necessary to replace the current-limiting fuses when they have blown, and also to provide interlocking mechanisms of various types (a) to ensure that the breaker trips when the fuse blows, (b) to prevent reclosing of the breaker while the fuse is blown, (c) to prevent reclosing of the breaker when the fuse is removed, (d) to prevent access to the fuse while the circuit breaker is closed, and (e) to ensure the replacement of a fuse of properly coordinated rating for a given breaker.

In my prior Patent No. 3,117,203, issued January 7, 1964, and assigned to the same assignee as the present invention, there is disclosed a current-limiting device which is repetitively operable and which may be used in series relation with a circuit breaker. The current-limiting device referred to comprises an element which normally has a relatively low resistance, but which on the occurrence of predetermined high current conditions, changes its nature to a relatively high resistance, to limit the current through the circuit breaker, although it does not itself interrupt the current.

In accordance with the aforesaid application, the net current which passes through the circuit breaker is relied upon to cause tripping or automatic opening of the breaker.

It is an object of the present invention to provide a combined circuit breaker and repetitively-operable current-limiting device which provides faster, more positive-acting tripping of the circuit breaker than devices heretofore available.

It is another object of the invention to provide a combined circuit breaker and repetitively operable current-limiting device which comprises a circuit breaker having minor overload tripping means such as thermally-responsive means, high-overload tripping means such as magnetically-operable tripping means, and a current-limiting device combined therewith in such a way that instantaneous tripping of the circuit breaker is assured when the current-limiting device comes into operation, as on the occurrence of exceptionally high short-circuit conditions.

It is a further object of the invention to provide a circuit breaker and current limiter combination utilizing a repetitively-operable current-limiting device and means for ensuring instantaneous tripping of the circuit breaker upon operation of the current-limiting device, by means which aids and improves the operation of the current-limiting device itself.

In accordance with the invention in one form, a circuit protective device is provided comprising separable contacts, manually operable mechanism for said contacts, and tripping means for causing automatic opening of said contacts upon the occurrence of predetermined current conditions. The tripping means includes a thermally-responsive member for sustained minnor short-circuit currents. The magnetically-operable means includes a magnetic core having a winding connected in parallel with a repetitively operable current-limiting device, whereby, upon operation of the current-limiting device, the aforesaid winding is energized, causing instantaneous tripping of the circuit breaker.

The invention will be more fully understood from the following detailed description, taken in conjunction with the accompanying drawings, in which:

FIGURE 1 is a side elevational view, partially in section, of a circuit protective device embodying the invention, one-half of the enclosing casing being removed;

FIGURE 2 is a schematic diagram of the device of FIGURE 1;

FIGURE 3 is an exploded perspective view of the magnetic tripping portions of the device in FIGURE 1;

FIGURE 4 is a sectional view, taken generally on the line 4—4 of FIGURE 1;

FIGURE 5 is a sectional view of the current-limiter device utilized in the invention;

FIGURE 6 is a semi-schematic representation of another embodiment of the invention;

FIGURE 7 is a semi-schematic representation of a further embodiment of the invention;

FIGURE 8 is a semi-schematic representation of still another embodiment of the invention.

FIGURE 9 is a graphical representation of current versus time relationship during a circuit interruption by a device constructed in accordance with the invention.

Referring to FIGURE 1, the invention is shown as incorporated in a circuit protective device comprising an insulating casing 10 (only one-half shown) of molded material having recesses and projections serving to support the various parts. The parts referred to comprise a pair of separable contacts, manually and automatically operable operating mechanism for such contacts, tripping mechanism for initiating automatic operation of the contacts, and a current-limiting device interconnected with the contacts and the tripping mechanism in a manner to be described.

1. *Circuit breaker operating mechanism*

The circuit breaker portion of the circuit protective device comprises a "line" or input terminal or socket 11 comprising a generally U-shaped member of relatively wide, thin, flat conductive material adapted to receive a contact blade or "stab," not shown.

The socket 11 has a bight portion 11A, having an extension 11B, carrying a relatively stationary contact 12.

A relatively movable contact 13 is provided, carried by a contact arm 14, pivotally supported by a releasable carrier 15 at 15A. The carrier 15, in turn, is pivotally supported at 16 in the casing 10, and includes a latch portion 15B, by which it is releasably held in the position shown in FIGURE 1 by means to be described.

The contact arm 14 is adapted to be moved about its pivotal support 15A by means of a manually operable handle 17, carried by a handle-support member 18, pivotally supported at 19 in the casing 10. The handle support member 18 is connected to the contact arm 14 by means of a tension spring 20.

Oscillatory movement of the handle 17 between "ON" and "OFF" positions, moves the spring 20 across the pivot 15A of the arm 14, and moves the arm 14 and the contact 13 between open and closed circuit positions.

2. Tripping mechanism

For the purpose of releasably holding the carrier 15 and releasing it upon the occurrence of predetermined current conditions, tripping mechanism is provided comprising a combined armature-latch member 21, pivotally supported at 21A in the casing 10, and including a latch portion 21B, releasably holding the latch portion 15B of the carrier 15.

For the purpose of moving the armature-latch member 21 to releasing position upon the occurrence of minor overload conditions, a thermally-responsive means is provided comprising a bimetallic strip 22, cantilever-supported at 23A on one end of a rigid terminal strap 23. The terminal strap 23, in turn, is rigidly supported with respect to the casing 10 by means of screw 23B.

For the purpose of moving the armature-latch 21 upon the occurrence of major overload or minor short-circuit conditions, a magnet 24 is provided. As may be seen from FIGURE 4, the magnet 24 is generally U-shaped, and straddles the bimetallic strip 22. The magnet 24 includes an integral extension 24A from the bight portion, rigidly attached to the terminal strap 23 to support the magnet. The magnet 24 also carries a pair of windings 25A, 25B, the purpose of which will be described hereafter. While I have shown the magnet 24 supported rigidly from the strap 23, it is also contemplated that the magnet 24 may be supported in any other suitable manner, such for instance as by being held in conforming recesses in the casing 10, or by being rigidly attached to the bimetallic strip 22.

Since the magnet 24 and the armature 21 are positioned on opposite sides of the bimetallic strip 22, which carries current therethrough, the magnetic flux associated with current passing through the bimetallic strip passes through the magnet 24 and the armature 21, and tends to draw these together.

On the occurrence of major overloads or minor short circuit currents therefore, the armature 21 is attracted to the magnet 24, causing the latch 21B to release the latch 15B, to permit opening of the contacts.

On the occurrence of minor overload conditions, persisting for a predetermined length of time, the bimetallic strip 22 warps so as to move its free end to the right as viewed. The free end of the bimetallic strip 22 engages a hook-like extension 21C of the armature-latch 21 and moves it to the tripped position, causing opening of the contacts.

The circuit breaker as thus far described, with the exception of the windings 25A, 25B, is conventional, and in accordance with the prior art.

3. Current-limiting means

In accordance with the invention, current-limiting means 26 is provided, comprising a pair of cylindrical terminal portions 26A, 26B, held in contact clips 27 and 28. The contact clip 27 is rigidly attached to the terminal strap 23. The contact clip 28 is rigidly attached to a terminal strap 29. The terminal strap 29 is rigidly supported on the casing 10 by means of a mounting screw 30, which also serves to rigidly connect it to a load cable connector 31.

The windings 25A, 25B, are connected in series with each other. The input end of the winding 25A is connected to the contact clip 27 by a conductor 32, and the output end of the winding 25B is connected to the contact clip 28 by a conductor 33.

The interconnection of the current-limiter 26, the windings 25A, 25B, the bimetallic strip 22, and the circuit breaker contacts, is therefore as shown schematically in FIGURE 2.

The current-limiter 26 is of the type shown in my prior Patent No. 3,117,203 issued January 7, 1964, and assigned to the same assignee as the present invention.

Referring to FIGURE 5, the current-limiter 26 comprises a pair of cylindrical metallic terminal portions 26A, 26B. The terminals 26A, 26B have integral circular flange portions 34, 35, respectively. A circular disc 36, of ceramic material is positioned between the flanges 34, 35, and is securely bonded thereto. A pair of annular rings 37, 38, are positioned against the outer surfaces of the flanges 34, 35, and are also securely bonded thereto.

The disc 36 has a central opening or capillary 39, therethrough, having enlarged end portions as shown. The capillary 39 and its enlarged end portions are completely filled with a liquid conducting medium such as mercury, which is contained therein by the terminal members 26A, 26B. Suitable filling-opening and sealing means, not shown, are also included, as described in my aforesaid application.

In operation, the current-limiter 26 normally has a relatively low resistance, the current passing from the terminal 26A to the terminal 26B through the mercury-filled capillary 39.

Upon the occurrence of high short-circuit conditions, the mercury in the capillary 39 is suddenly transformed to a vapor state, although confined to its initial volume. Conduction through the vapor occurs by an arcing process, but the resistance therethrough is such as to limit the current to a very low value.

During normal conditions, the windings 25A, 25B, are in effect, short-circuited or bypassed by the limiter 26, which under such conditions, has a very low resistance.

When the current-limiter 26 "fires" or changes its state to a vapor, its resistance increases greatly, as previously stated. A portion of the current therefore is diverted to the windings 25A, 25B. When the windings 25A, 25B, are energized in this manner, they create a high magnetic flux through the magnet 24, instantaneously drawing the armature 21 to the magnet 24, and releasing the latched member 15, to cause opening of the contacts.

It will be observed that regardless of to what low value the current through the limiter 26 may be restricted by its change of resistance action, the circuit breaker will be instantaneously tripped by the current bypassed through the windings 25A, 25B.

An unusual advantage has been found to result from the combination of the invention. This advantage is the fact that the presence of the windings 25A, 25B across the limiter 26 acts to reduce the energy dissipation requirements of the limiter. The energy-diverting action of the combination is well shown by oscillograph records of the current-vs.-time relationship in a limiter under short-circuit conditions. In FIGURE 9, for example, A represents a rapidly rising short-circuit current, through a limiter, which current increases until point P, at which time the limiter "fires" or changes to high-resistance condition.

Line B of FIGURE 9 represents the decreasing current through such a limiter when it is used in simple series connection in a circuit to be protected.

Line C in FIGURE 9, on the other hand, represents the decreasing current through such a limiter when used in a combination in accordance with the invention.

The shaded area between the lines B and C represents the energy reduction or diverted energy due to the presence of the windings 25A, 25B, in parallel with the limiter. By measurement of actual oscillograms, it is estimated that such energy diverted may be as high as 90% of the total energy otherwise developed in the limiter.

In accordance with the invention, therefore, a long-life, effective, and dependable circuit protective device is thereby provided.

In the embodiment of the invention shown in FIGURE 6, a compact, high-speed protective device is provided, comprising a magnetic core 40 having main pole portions 40A, 40B and an armature 41. A movable contact 42 is carried by a resilient contact arm 43 mounted on the armature 41, and adapted to contact a relatively stationary contact 44. The armature 41 is carried by a non-magnetic bracket 41B which is pivotally supported on a pivot pin 41A.

The core 40 includes an integral extension 40C extending a major part of the way between the main poles 40A, 40B, leaving an air gap 40D. A bimetallic strip 45 is rigidly mounted at one end with respect to the core 40 by suitable means, not shown, and carries a magnetic slug 46 at its movable end, adjacent the air gap 40D.

For the purpose of latching the armature 41 in closed position under certain conditions, to be described, a magnetic latch member 47 is provided, pivotally supported at 48 on a non-magnetic bracket 49. The latch member 47 includes a tapered end portion 50, which is adapted to be received into a generally V-shaped notch 51 in the core member 40. The latch member 47 also carries a generally hook-shaped retaining latch 52 adapted to engage a projection 53 on the armature 41.

A main winding 54 is positioned on the bight portion of the core 40, and a flux-shifting winding 55 is positioned on the extension 40C of the core member 40. The winding 55 is connected across a current limiting device 26', the limiter 26' is connected between the contact arm 43 and a suitable source of power 56. The load to be controlled, indicated at 57, is connected between the stationary contact 44 and the winding 54, and the bimetallic strip 45 is connected in series relation with these elements and the other side of the source 56.

The main current flow through the device is therefore from the source 56 to the current limiter 26', to the contact arm 43, through the contacts 42, 44, to the load 57, to the winding 54, through the bimetallic strip 45, to the other side of the source 56. The flux created by the winding 54 serves to hold the armature 41 in the closed position as shown against the bias of a compression spring 41C.

Upon the occurrence of minor overload conditions in the circuit, the bimetallic strip 45 becomes heated and warps in a direction to move the magnetic slug 46 into the air gap 40D, thereby bypassing a substantial portion of the magnetic flux from the main poles 40A, 40B, and causing the armature 41 to be released, moving the contact 42 to open circuit position.

It will be observed that while the core 40 is energized by the winding 54, the portion 50 of the magnetic latch member 47 is held in the notch 51, holding the latch member 47 in non-interfering position against the force of the tension spring 47A. Thus during overload conditions as just described, the armature is free to move to released position.

The function of the magnetic latch member 47 is to hold the armature 41 in closed position when the winding 54 is de-energized due to some cause other than opening of the contacts 42, 44, such for example as interruption of the circuit by another switching means, not shown, or due to a power failure. In such event, the portion 50 of the latch 47 is released, and the latch is drawn to holding position by tension spring 47 to a position in which the latch portion 52 overlies the projection 53 of the core 41. This occurs before the core 41 is able to move away from the poles 40A, 40B, because of the lower inertia of the magnetic latch 47, combined with the suitably selected force of the spring 47A.

Referring still to FIGURE 6, a current limiting device 26' is provided, electrically in parallel with the flux-shifting winding 55. Upon the occurrence of short-circuit current conditions of predetermined magnitude, the current limiter 26' changes its characteristics from a relatively low resistance to a relatively high resistance, causing current flow through the winding 55.

The current limiter 26' has its construction and characteristics similar to the current limiter 26 previously described. The current limiter 26' normally has a relatively low resistance, and therefore normally short-circuits or bypasses the winding 55 so that substantially no current flows therethrough.

When the winding 55 is energized, it generates a flux through the portion 40C, across the air gap 40D and around the minor magnetic loop including the armature 41, in a direction opposite to the direction of the flux flowing through the armature 41 from the main winding 54. Energizing of the winding 55 therefore causes instantaneous releasing of the armature 41, which is moved to open position by the compression spring 41C, opening the contacts 42, 44. The device remains in the open circuit condition until reclosed by suitable means, such as by manually moving the armature 41 to the closed position.

This construction affords all of the advantages described in connection with the form of the invention shown in FIGURE 1, and in addition provides an extremely fast-action opening device, due to the magnetic flux-shifting release action, and the fact that no other mechanism or parts are introduced between the magnetically held armature 41 and the movable contact 42.

Oscillograms and motion pictures of a device constructed as shown in FIGURE 6, showed that the armature 41 began its opening movement within .046 millisecond after the current limiter 26 fired, and the contacts 42, 44 were separated within .6 millisecond after current limiter firing. The contact 42 had moved to generate a ¼" air gap within .003 second following firing of the limiter 26'.

In the form of the invention shown in FIGURE 7, a 3-phase protective device is shown, comprising a generally E-shaped magnetic core comprising a permanent magnet portion 60, side portions 61, 62, and a central portion 63. A movable armature 64 is provided, which is biased toward open position by tension springs 65. The central portion 63 has three windings, 66, 67 and 68 thereon. Each of the windings 66, 67, 68, has a current limiting device 26–1, 26–2, 26–3, connected across it. Each of the limiters is also in series relation with a separate phase conductor of a 3-phase electrical source, not shown. Flux generated by each of the windings 66, 67, 68, acts to cause a flow of magnetic flux around both minor loops of the magnetic circuit including the central core 63 and each of the outside portions 61, 62, respectively. It will be observed that regardless of the direction of current flow through each of such windings, the direction of flux flow through one or the other of the side portions 61, 62, will be in opposition to the direction of the flux due to the permanent magnet portion 60. Thus release of the armature 64 is caused by energizing any one of the windings 66, 67, 68. Each of the windings referred to is short-circuited during normal conditions by its corresponding current limiter, which as previously described, normally has an extremely low resistance, whereby substantially no current flows through the corresponding winding. Upon the occurrence of short-circuit conditions, however, the limiter changes to high resistance condition, causing current flow through the corresponding winding.

The windings 66, 67, 68, are preferably constructed so as to have a substantially different number of turns one from the other. Thus, for example, the ratio of turns may be 1:2:4. This construction assures that there will be a net subtractive flux due to current flow in the windings 66, 67, 68, regardless of whether the short-circuit conditions are due to a single phase, two-phase, or three-phase short. Thus if the short-circuit occurs between phases 1 and 2, such that the current through the winding 66 is equal and opposite to the current in the winding 67 a net flux will be produced so as to cause releasing of the armature 64. The same is true of a short-circuit between any other two phases, and also in the case of a three-phase short circuit.

The turns ratio of the windings 66, 67, 68, is moreover preferably selected so that the difference between any two windings, as well as the difference between the sum of any two windings and the third winding, leaves a net difference to produce flux.

In the form of the invention illustrated in FIGURE 8, magnetic tripping means is illustrated of the type utilizing a normally open magnetic device comprising a core 70, an armature 71, and windings 72, 73, 74. The windings 72, 73, 74 have current-limiting devices 26–A, 26–B, 26–C, connected in parallel therewith respectively. As in the previous case, a short-circuit of any nature causes a net flux to exist such as to cause attraction of the armature 71, which acts on a trip bar 75 to cause releasing of a biased latch-holding member 76, to permit opening of a contact carrying member 77. The common trip member 75 is also adapted to be actuated by thermal action by any of the bimetallic strips 78.

It will be observed that there is provided in accordance with the invention a circuit protective device including a current limiting element which limits the rise of short-circuit currents and at the same time causes actuation of magnetic releasing means to cause instantaneous opening of the controlled contacts immediately upon actuation of the current limiting means.

While the invention has been illustrated in certain particular forms, it will be readily apparent that many modifications thereof may be made, and it is therefore intended by the appended claims to cover all such modifications as fall within the true spirit and scope of the invention.

What I claim as new and desire to secure by Letters Patent of the United States is:

1. An electric circuit protective device comprising:
   (a) at least one pair of relatively separable contacts;
   (b) a magnetic core member;
   (c) a magnetic armature member movable toward and away from said core member;
   (d) means biasing said armature member for movement away from said core member;
   (e) means for causing opening movement of said separable contacts upon movement of said magnetic armature away from said core;
   (f) a main winding on said core member connected electrically in series with said separable contacts;
   (g) said magnetic armature being adapted to be held in attracted position with respect to said core member by magnetic flux created by flow of a first predetermined current through said main winding;
   (h) a secondary winding carried by said core member;
   (i) a current limiting device connected electrically in series with said separable contacts and said main winding, said current limiting device having a relatively low electrical resistance under normal operating conditions and changing to relatively high resistance upon the occurrence of predetermined current conditions therethrough without permanently interrupting current therethrough;
   (j) said secondary winding being connected electrically in parallel with said current limiting device, whereby the change of resistance of said current limiting device from said relatively low electrical resistance to said relatively high electrical resistance condition causes an increased flow of current through said secondary winding;
   (k) said secondary winding when energized creating flux acting to decrease the holding effect of flux from said main winding, release of said magnetic armature member, and opening of said contacts.

2. An electric circuit protective device as set forth in claim 1, wherein said device also includes an armature latch member, and means biasing said armature latch member toward latching position to hold said armature in said attracted position with respect to said core member, said core member having a portion disposed and arranged to attract a portion of said latch member thereto upon the occurrence of predetermined current through said main winding, whereby to hold said armature latch member in non-latching position so long as a predetermined current flows in said main winding.

3. A magnetically operable device comprising a magnetic core member having:
   (a) at least one pair of main pole portions;
   (b) a magnetic armature movable toward and away from said core member, and biased for movement away from said core member;
   (c) means for creating a first magnetic flux for attracting and holding said magnetic armature in contact with said core member;
   (d) a plurality of secondary windings carried by said core member;
   (e) a current limiting device connected electrically in parallel with each of said secondary windings, each of said current limiting devices having a relatively low electrical resistance under normal operating conditions and changing to relatively high resistance upon the occurrence of predetermined current conditions therethrough without permanently interrupting current therethrough;
   (f) each of said current limiting devices having means for connecting it in a separate electric circuit;
   (g) said secondary windings each being disposed and arranged to create a flux upon the occurrence of predetermined current conditions therethrough such as to cause release of said magnetic armature, whereby a change of electrical resistance of any one of said current limiting devices causes an increase current through a corresponding secondary winding and release of said magnetic armature.

4. A magnetically operable device as set forth in claim 3 wherein said secondary windings each has a number of turns different from the number of turns of each of the other sceondary windings.

5. A magnetically operable device as set forth in claim 3 wherein three of said secondary windings are provided, said secondary windings having turns bearing a ratio of 1:2:4 respectively.

6. An electric circuit protective device comprising:
   (a) a plurality of pairs of relatively movable contacts;
   (b) a single magnetically operable means for causing opening movement of all of said pairs of relatively movable contacts;
   (c) said magnetically operable means comprising a magnetic core member and an armature movable relative thereto;
   (d) means for causing opening movement of all of said pairs of relative movable contacts upon movement of said armature member toward said core member;
   (e) a plurality of electrical windings on said core member, one for each of said pairs of relative movable contacts;
   (f) a current limiting device connected electrically in parallel with each of said windings, said current limiting device having a relatively low resistance under normal operating conditions and changing to relatively high resistance upon the occurrence of predetermined current conditions therethrough without permanently interrupting current therethrough;
   (g) means connecting each of said current limiting devices electrically in series with a corresponding pair of said relatively movable contacts;
   (h) whereby a change of resistance of any one of said current limiting devices from said relatively low electrical resistance to said relatively high resistance causes energizing of a corresponding one of said electrical windings and actuation of said magnetic armature to cause opening of all of said pairs of relatively movable contacts.

7. An electric circuit protective device as set forth in claim 6 wherein said electrical windings each has a number of turns different from a number of turns of each of the other of said windings.

8. An electric circuit protective device as set forth in claim 6 wherein said plurality of pairs of relatively movable contacts comprise at least three pairs of contacts and the corresponding windings therefor have turns such that the ratio thereof is 1:2:4.

9. An electric circuit protective device comprising:
   (a) a magnetic core member;
   (b) a magnetic armature movable toward and away from said core member;
   (c) a plurality of electrical windings on said core member;
   (d) a current limiting device connected electrically in parallel with each of said windings, each of said current limiting devices having a relatively low electrical resistance under normal operating conditions and changing to relatively high resistance upon the occurrence of predetermined current conditions therethrough without permanently interrupting current therethrough;
   (e) each of said current limiting devices having means for connecting it in a separate phase of a multi-phase electrical circuit;
   (f) said windings each being disposed and arranged to create a flux upon the occurrence of predetermined current conditions therethrough such as to cause movement of said armature with respect to said core member, whereby a change of electrical resistance of any one of said current limiting devices causes an increase of current through a corresponding one of said windings and movement of said armature with respect to said core member.

10. An electric circuit protective device as set forth in claim 9 wherein three of said windings are provided, said windings having turns bearing a ratio of 1:2:4 respectively.

References Cited by the Examiner

UNITED STATES PATENTS

| | | | |
|---|---|---|---|
| 934,063 | 9/1909 | Fonecha | 317—46 |
| 1,134,752 | 4/1915 | Leonard | 317—57 |
| 1,394,087 | 10/1921 | Heinrich. | |
| 2,306,728 | 12/1942 | Heddaeus | 200—113 |
| 3,031,601 | 4/1962 | Rudolph | 317—57 X |
| 3,076,072 | 1/1963 | Roschuk | 200—87 |

BERNARD A. GILHEANY, *Primary Examiner.*

R. N. ENVALL, JR., *Assistant Examiner.*